US010344648B2

(12) United States Patent
Hodgson et al.

(10) Patent No.: US 10,344,648 B2
(45) Date of Patent: Jul. 9, 2019

(54) PUMP FOR CONVEYING A LIQUID, PARTICULARLY AN EXHAUST GAS CLEANING ADDITIVE

(71) Applicant: CONTINENTAL AUTOMOTIVE GMBH, Hannover (DE)

(72) Inventors: Jan Hodgson, Troisdorf (DE); Yves Kopp, Remering-les-Puttelange (FR); Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 78 days.

(21) Appl. No.: 15/127,095

(22) PCT Filed: Mar. 18, 2015

(86) PCT No.: PCT/EP2015/055668
§ 371 (c)(1),
(2) Date: Sep. 19, 2016

(87) PCT Pub. No.: WO2015/140207
PCT Pub. Date: Sep. 24, 2015

(65) Prior Publication Data
US 2017/0114692 A1    Apr. 27, 2017

(30) Foreign Application Priority Data

Mar. 19, 2014 (EP) .................... 14290071

(51) Int. Cl.
*F01N 3/20* (2006.01)
*F04C 5/00* (2006.01)
*F04C 15/06* (2006.01)
(52) U.S. Cl.
CPC .............. *F01N 3/2066* (2013.01); *F04C 5/00* (2013.01); *F04C 15/06* (2013.01);
(Continued)

(58) Field of Classification Search
CPC .... F01N 3/2066; F01N 3/206; F01N 2610/02; F01N 2610/1406; F01N 2610/1433;
(Continued)

(56) References Cited

U.S. PATENT DOCUMENTS 2,544,628 A * 3/1951 Copping ................. F04B 43/14
417/476
3,408,947 A   11/1968 McMillan
(Continued)

FOREIGN PATENT DOCUMENTS

DE   2853916 A1   6/1980
DE   3815252 A1   11/1989
(Continued)

*Primary Examiner* — Laert Dounis
*Assistant Examiner* — Kelsey L Stanek
(74) *Attorney, Agent, or Firm* — Laurence A. Greenberg; Werner H. Stemer; Ralph E. Locher (57) ABSTRACT

A pump for conveying liquid includes a pump housing with an inlet and an outlet. An eccentric mounted at the housing rotates about an axis relative to the housing. A deformable element is disposed between the housing and the eccentric. A delivery duct from the inlet to the outlet is formed by the deformable element and a circumferential housing surface. The deformable element is pressed in sections against the housing by the eccentric to form a displaceable seal of the delivery duct and a closed pump volume in the delivery duct, which can be displaced along the delivery duct from the inlet to the outlet by a movement of the eccentric to convey liquid. A channel cross-section of the delivery duct is limited by the circumferential surface, a set-back duct surface of the deformable element and a contact seal between the circumferential surface and the deformable element.

7 Claims, 5 Drawing Sheets (52) U.S. Cl.
CPC .. *F01N 2610/02* (2013.01); *F01N 2610/1406* (2013.01); *F01N 2610/1433* (2013.01); *F01N 2610/1453* (2013.01); *F04C 2210/1083* (2013.01); *F04C 2220/24* (2013.01); *F04C 2240/30* (2013.01); *Y02A 50/2325* (2018.01); *Y02T 10/24* (2013.01)

(58) Field of Classification Search
CPC .... F01N 2610/1453; F04C 5/00; F04C 15/06; F04C 2210/1083; F04C 2220/24; F04C 2240/30; Y02T 10/24
USPC .................................................. 60/301, 295
See application file for complete search history.

(56) References Cited

U.S. PATENT DOCUMENTS

| | | |
|---|---|---|
| 4,332,534 A | 6/1982 | Becker |
| 5,006,049 A | 4/1991 | Von Der Heyde et al. |
| 9,453,507 B2 | 9/2016 | Ghodsi-Kameneh et al. |
| 2014/0017094 A1* | 1/2014 | Ghodsi-Kameneh ........................ F01C 21/08 417/44.1 |
| 2014/0227107 A1 | 8/2014 | Bauer et al. |
| 2017/0016444 A1* | 1/2017 | Hodgson ............... F01N 3/2066 |

FOREIGN PATENT DOCUMENTS

| | | | | |
|---|---|---|---|---|
| FR | 1228534 A | 8/1960 | | |
| WO | 2012126544 A1 | 9/2012 | | |
| WO | 2013057178 A1 | 4/2013 | | |
| WO | WO 2013057178 A1 * | 4/2013 | .............. | F04B 43/04 |

\* cited by examiner

PRIOR ART

PUMP FOR CONVEYING A LIQUID, PARTICULARLY AN EXHAUST GAS CLEANING ADDITIVE

BACKGROUND OF THE INVENTION

Field of the Invention

The invention relates to a pump for delivering a liquid, said pump being suitable in particular for delivering an exhaust-gas purification additive (such as, for example, urea-water solution) into an exhaust-gas treatment device for the purification of the exhaust gases of an internal combustion engine.

Exhaust-gas treatment devices in which a liquid additive is used for exhaust-gas purification are widely used for example in the automotive field, wherein in particular, it is sought to remove inter alia nitrogen oxide compounds from the exhaust gas. The so-called SCR method (SCR method, SCR=Selective Catalytic Reduction) is used in exhaust-gas treatment devices of said type. In this method, nitrogen oxide compounds in the exhaust gas are reduced with the aid of a reducing agent (normally ammonia). Ammonia is commonly stored in the motor vehicle not directly but rather in the form of a liquid (exhaust-gas) additive which is converted into ammonia outside the exhaust gas (in an external reactor provided especially) and/or within the exhaust gas (in the exhaust-gas treatment device). In this context, urea-water solution is used as liquid additive. A urea-water solution with a urea content of 32.5% is available under the trade name AdBlue®.

In the motor vehicle, the liquid additive is commonly stored in a tank and introduced into the exhaust-gas treatment device by means of a delivery module. A delivery module comprises, in particular, a pump. The delivery module may also be assigned the following components: filter, sensor, valve and/or dosing unit.

A problem in the case of a delivery module for liquid additive is that the latter can freeze at low temperatures. A 32.5% urea-water solution freezes, for example, at −11° C. In the automotive field, such low temperatures can arise in particular during long standstill phases in winter.

When the additive freezes, an increase in volume occurs which can damage or even destroy the lines, ducts and/or components of the delivery module. The focus here is in particular also on the pump. Destruction of the pump may for example be avoided by virtue of the delivery module being evacuated upon deactivation, such that no liquid additive remains in the delivery module during a standstill phase. Another approach for protecting the pump is for the components to be designed such (to be so flexible) that no instances of damage can be caused by the volume expansion of the liquid additive as it freezes.

In particular within the pump, it is technically difficult to ensure measures for protection against freezing, because the pump must be in intensive contact with the liquid additive. Furthermore, a complete evacuation of the pump is often problematic because the resumption of delivery after a stoppage of operation is made considerably more difficult as a result. The pump for delivering liquid additive should also be inexpensive and exhibit high durability. This encompasses in particular high reliability and/or low failure probability and also slow aging, the term "aging" in this case referring in particular to a change in operating behavior of the pump as a result of wear.

Furthermore, in the case of the pump, an exact delivery flow rate and delivery capability may also be of importance. This or the expression "dosing accuracy", is meant here in particular to mean that the liquid flow rate actually delivered by the pump is predefined precisely by clearly determinable input variables, wherein here, the expression "input variables" describes in particular the electric actuation of the operation of the pump (voltage profile and/or current profile for driving the pump, frequency of current pulses for driving the pump etc.). In particular, it is important that the number and/or relevance of cross-influences that influences the dependency of the delivery flow rate on the input variables is kept low. Such cross-influences could for example be the temperature of the pump, the pressure in the pump etc. If significant cross-influences are unavoidable, it should be possible to calculate and/or monitor the effect of said cross-influences on the delivery flow rate as accurately as possible. The dosing accuracy of a pump can be described for example by means of a statistical deviation between an expected, desired delivery flow rate and an actually delivered delivery flow rate. A pump has for example a high dosing accuracy if said deviation is, on average, less than 10%. A dosing accuracy (for urea-water delivery flow rates in the case of the SCR method) is considered to be low for example if said deviation is on average more than 20%. These percentage values should in each case be understood merely as examples.

The documents U.S. Pat. Nos. 2,544,628, 3,408,947, DE 285 39 16 A1 and DE 381 52 52 A1 disclose a pump type also referred to as an orbital pump. Said pump type is on the one hand relatively durable with regard to a volume expansion of the liquid in the event of freezing, and furthermore said pump type can also be operated in a reversed delivery direction, such that an evacuation of a delivery module is possible in a technically simple manner. There is however a requirement for said pump type to be adapted to the demands in the field of the SCR method, in particular with regard to improving the dosing inaccuracy and/or aging behavior (for example owing to considerable stress states in the pump diaphragm).

BRIEF SUMMARY OF THE INVENTION

Taking this as a starting point, it is an object of the present invention to propose a particularly advantageous pump for the delivery of a liquid, which pump at least partially solves the above problems and is in particular suitable for the delivery of liquid additives for exhaust-gas purification (such as urea-water solution).

Said objects are achieved by means of a pump according to the features described below. Further advantageous refinements of the pump are also specified below. It is pointed out that the features presented in the individual patent claims may be combined with one another in any desired technologically meaningful way and may be supplemented by explanatory facts from the description, with further design variants of the pump being specified.

The invention proposes a pump for the delivery of a liquid, which pump has at least one pump housing with at least one inlet and at least one outlet. On the pump housing, there is arranged an eccentric which is rotatable relative to the pump housing about an axis. An (annular) deformable element is arranged between the pump housing and the eccentric. A delivery duct is formed from the at least one inlet to the at least one outlet by the deformable element and by a (cylindrical) circumferential surface of the pump housing. Furthermore, the deformable element is pressed in sections against the pump housing by the eccentric such that at least one displaceable seal of the delivery duct and at least one closed pump volume in the delivery duct are formed, these being displaceable along the delivery duct from the inlet to the outlet by means of a movement of the eccentric for the delivery of the liquid, with at least one duct cross section of the delivery duct is delimited by the (cylindrical) circumferential surface, by a set-back duct surface of the deformable element and by at least one (annular) contact seal between the circumferential surface and the deformable element.

A pump of such construction may also be referred to as an orbital pump.

The pump has a (central) axis about which the eccentric can be rotated. For this purpose, it is preferable for a drive shaft to extend along the drive axis, which drive shaft connects the eccentric to an (electrically operable) drive. The drive is preferably arranged along the axis, above and below the pump housing. For the description of the pump and of the components in spatial terms, a radial direction is hereinafter assumed which is perpendicular to the axis of the pump and which extends outward in a radial direction proceeding from the axis of the pump. A circumferential direction is defined perpendicular and in particular tangentially to the axis and perpendicular and in particular tangentially to the radial direction. The (central) axis preferably also gives rise to an axis of symmetry of the housing. The delivery duct extends at least in sections along said circumferential direction through the pump housing, or along the circumferential surface of the pump housing, from the inlet to the outlet of the pump. For the further description of the pump, a central plane of the pump is also defined. Said central plane is arranged perpendicular to the axis. The pump housing, the eccentric, the deformable element and the delivery duct lie in the central plane.

The pump housing of the pump is preferably constructed in the manner of a ring or a cylindrical chamber, inside which the eccentric is arranged. This is the preferred design of the pump. In this design, the circumferential surface of the pump housing is an inner circumferential surface. The pump housing may also be regarded as an (external) stator, wherein the eccentric is referred to as an (internal) rotor. In a further embodiment of the pump, it is possible for the pump housing to form an internal stator which is surrounded by the eccentric. The eccentric then forms an external rotor. This alternative embodiment is a kinematic reversal of the alternative embodiment with the circumferential surface as an internal circumferential surface. The inlet and the reason are arranged on the pump housing and permit the inflow and outflow of the liquid into the pump housing and into the delivery duct. The pump housing is preferably composed of plastic. Stiffening structures may be integrated in the pump housing. In a preferred design variant, in a pump housing composed of plastic, there is integrated an annular metallic insert which stiffens the pump housing.

In this case, the expression "eccentric" means in particular a circular structure which is arranged eccentrically with respect to the axis and which performs an eccentric movement when it rotates about the axis. An annular or encircling gap is formed between the pump housing and the eccentric, in which gap the deformable element is arranged. The delivery duct is arranged (within the gap) between the deformable element and the pump housing and is delimited by the pump housing and the deformable element. The gap has at least one constriction which is displaced along the pump housing or along the delivery path by a rotation of the eccentric. At the constriction, the deformable element is pressed against the pump housing such that the displaceable seal is formed there. This in particular also encompasses so-called "multivalent" eccentrics which have multiple constrictions and thus also form multiple seals (between the deformable element and the pump housing). Such eccentrics may for example be designed as roller-type eccentrics which have a multiplicity of rollers which roll on the deformable element. Here, the rollers in each case form the constrictions.

Between the pump housing and the deformable element, the delivery duct has a duct cross section through which liquid can flow, which duct cross section may for example (depending on the size of the pump) amount to between 1 $mm^2$ (square millimeter) and 50 $mm^2$ at the largest point. The delivery duct is formed annularly, or in an encircling manner, around the axis. The inlet and the outlet are preferably arranged with an angular spacing of greater than 270° with respect to one another (measured in the central plane) in a delivery direction of the pump. Counter to the delivery direction, the inlet and the outlet thus have an angular spacing of less than 90° with respect to one another.

The eccentric is preferably of multi-part form. The eccentric preferably has an inner region which performs an eccentric rotational movement. Furthermore, an outer bearing ring may be provided which surrounds the inner region. It is preferable for at least one bearing to be situated between the inner region and the outer bearing ring. Said bearing may be a ball bearing or a roller bearing. The inner eccentric region of the eccentric performs a rotation about the axis during operation. The eccentric arrangement, and if appropriate also the external shape of the eccentric, result(s) in an eccentric movement of a surface of the eccentric. The eccentric movement is transmitted to the outer bearing ring. By means of a bearing between the inner region and the bearing ring, an eccentric rotational movement of the inner region can be converted into an eccentric wobbling movement of the bearing ring without the rotational movement component of the movement of the inner region also being transmitted. The fact that the movement of the bearing ring does not have a rotational movement component makes it possible for shear stresses in the deformable element and internal friction forces of the pump to be reduced. The deformable element is flexed owing to the movement of the eccentric. It is preferable for only pressure forces and substantially no friction forces to act at a contact surface of the eccentric and of the deformable element. A corresponding division of the eccentric into an inner eccentric region and a bearing ring is also possible if the eccentric is an external rotor arranged around an (inner) pump housing. It is also possible for the outer bearing ring to be dispensed with and for the rollers of the bearing to roll directly on against the deformable element.

The deformable element is preferably arranged between the eccentric and the pump housing in such a way that the eccentric presses the deformable element regionally against the pump housing such that the at least one displaceable seal is thereby formed. At the seal, there is (linear or areal) contact between the deformable element and the pump housing, which has the effect that the liquid cannot flow through. In other words, the deformable element bears fully against the pump housing, such that the duct cross section has no cross-sectional area in the region of said displaceable seal. The delivery duct is accordingly interrupted in the region of the displaceable seal. It is thus the case that a closed pump volume is formed within the delivery duct. The reference to a closed pump volume means that there is a section of the delivery duct which is closed off at least on one side. By means of a displacement of the displaceable seal, the at least one closed pump volume is also displaced, such that the liquid situated in the closed pump volume is delivered. It is preferable if, during the operation of the pump, multiple closed pump volumes are displaced from the inlet of the pump to the outlet of the pump in order to deliver the liquid. In this way, a closed pump volume is created (meaning closed off at least on one side) in the vicinity of the inlet and is then eliminated (meaning opened again at least on one side) at the outlet. At the inlet, a closed pump volume is closed off by a displaceable seal only on one side, in a downstream direction, and is connected in an upstream direction to the inlet, such that the liquid can flow through the inlet into the closed pump volume. At the outlet, the closed pump volume is (still) closed off by a seal (only) on one side, this however being in an upstream direction, and said closed pump volume is connected in a downstream direction to the outlet, such that the liquid can flow through the outlet out of the closed pump volume. In between (on the path of the closed pump volume from the inlet to the outlet), there is a phase in which the closed pump volume is closed off upstream and downstream by the at least one displaceable seal at both sides.

The deformable element may also be referred to as a deformable diaphragm. The expression "diaphragm" does not imperatively specify whether the deformable element has an areal extent. The expression "diaphragm" should be understood as an indication that the deformable element is a flexible structure that can be deformed for the delivery of liquid. As material for the deformable element or the deformable diaphragm, use is preferably made of an elastomer (for example natural rubber or latex). To increase the durability and/or to establish and maintain the flexibility, the material of the deformable element may include additives. The deformable element is preferably flexible in all directions (in the axial direction, in the radial direction and in the circumferential direction). It is however also possible for the deformable element to exhibit at least partially directional flexibility. Said deformable element may for example exhibit greater flexibility in the radial direction than in the circumferential direction and in the axial direction. A deformation of the deformable element in one direction typically also causes a deformation in other directions. The deformable element expands for example in the axial direction and/or the circumferential direction when compressed in the radial direction.

On the pump, there is preferably provided a static seal which prevents an undesired backflow of the liquid from the outlet to the inlet (counter to the delivery direction). The static seal may be provided so as to be positionally fixed with respect to the pump housing and positioned between the outlet and the inlet. The deformable element may, in the region of the static seal, for example, be clamped or adhesively bonded to the pump housing so as to permanently ensure a fluid-tight seal between the pump housing and the deformable element. The static seal is fluid-tight regardless of the position of the eccentric.

The delivery duct in the pump, which delivery duct connects the inlet to the outlet, has a duct cross section. Said duct cross section is delimited at one side by the pump housing and at the other side by the deformable element.

There are preferably two (annular) contact seals at which the deformable element and the pump housing make contact with the (cylindrical) circumferential surface and which run along the delivery duct or along the circumferential direction. The duct cross section of the delivery duct is situated between said two (annular) contact seals. Below, contact seals and the further elements of the pump described in conjunction with contact seals are often described only singly, wherein then it is normally indicated that "at least" one contact seal or "at least" one further element (counter bracket, thickened portion, receptacle, abutment surface, edge region etc.) is provided. This wording is also intended to encompass a pump in which the described elements are formed only on one side of a central plane of the pump, wherein another (different) design is realized on the other side of the central plane. It is however preferable for the pump and in particular the deformable element together with the adjacent further elements to be constructed symmetrically with respect to the central plane, such that all elements (counter bracket, contact seal, thickened portion, receptacle, abutment surface, edge region etc.) provided on one side of the pump are provided again (mirror-symmetrically) on the other side of the central plane.

The described elements (counter bracket, contact seal, thickened portion, receptacle, abutment surface, edge region etc.) are furthermore preferably all of annular form. This means that the elements are (at least in sections) of rotationally symmetrical form with respect to the axis of the pump. In particular in the region of the static seal, said elements however generally deviate from the rotationally symmetrical shape. The stated elements have, for example, a discontinuity there. The stated elements are in this case referred to as "annular" despite deviations from the rotationally symmetrical shape. Therefore, here, the expression "annular" is in particular to also be understood as encompassing "annular at least in sections", "predominantly annular" and/or "partially annular".

A delivery of liquid in the delivery direction from the inlet to the outlet is preferably possible by means of the pump. If appropriate, a reversal of the delivery direction (from the outlet back to the inlet rather than from the inlet to the outlet) is also possible by means of a reversal of the direction of rotation of the eccentric.

The special delimitation of the delivery duct by the circumferential surface of the pump housing and by the deformable element plays an important role for the solution to the problems mentioned in the introduction. In the case of the proposed pump, the delivery duct is delimited by a (cylindrical) circumferential surface of the pump housing and a set-back duct surface of the deformable element. The (cylindrical) circumferential surface is in particular a surface which has a planar cylindrical form and which is neither concave nor convex in the axial direction. The cylindrical circumferential surface is preferably an inner surface of the pump housing.

A set-back duct surface may also be referred to as a "concave" duct surface. A set-back duct surface may also be defined by stating that it is, by way of the circumferential surface, set back, such that a cross section through which flow can pass (the duct cross section or the duct cross-sectional area) is formed, between two (linear) contact seals. The duct surface is set back in relation to the circumferential surface or in relation to the contact seals.

It is the concave or set-back duct surface of the deformable element that first makes it possible for the delivery duct to have a cross section through which flow can pass. Here, the expression "concave" does not imperatively mean that there must be a (consistent) curvature of the duct surface. Rather, the expression "concave" is also intended to express that the duct surface is set back in an axial direction between two contact seals, such that the cross section through which flow can pass is formed by the concave surface. In other words: In a section plane through the delivery duct spanned by the axis and an arbitrary radial direction, the duct cross section is delimited by an arc segment of the set-back or concave duct surface of the deformable element and by a line formed by the circumferential surface of the pump housing, and by two punctiform contact points (of the contact seal). If the described section plane (spanned by the axis and by the radial direction) through the deformable element and the pump housing is viewed in the region of the deformable seal, it can be seen that, there, the deformable element bears linearly against the circumferential surface, such that the duct cross section is completely closed.

Regardless of the operating conditions of the pump, the circumferential surface of the pump housing constitutes a clear delimitation of the delivery duct (in the radial direction). The at least one (annular) contact seal is consequently always situated on the circumferential surface. At the at least one contact seal, radial clamping forces act which press the deformable element jointly against the circumferential surface of the pump housing in order to delimit the delivery duct laterally (in an axial direction).

This design of the contact seals leads to a particularly expedient stress distribution within the deformable element. In particular, the forces at the contact seals and the forces at the displaceable seal act parallel to one another (in a radial direction). The sealing forces on the deformable element on the static seal preferably likewise act in a radial direction parallel to the forces on the contact seals and on the displaceable seal. By means of the construction described of an orbital pump, it is possible for undesired multi-axis stress states in the deformable element to be avoided in an effective manner. This considerably reduces the ageing of the deformable element. The construction, described here, of an orbital pump thus exhibits considerably improved durability. In addition, a good dosing accuracy of the pump can be ensured over a long operating duration of the pump.

The pump is particularly advantageous when the (cylindrical) circumferential surface continues in the axial direction beyond the delivery path to both sides.

This means in particular that the (cylindrical) circumferential surface continues (in the axial direction) beyond the (annular) contact seals. For example, the cylindrical circumferential surface extends (in the axial direction) between 1 mm (millimeter) and 10 mm beyond the duct cross section to both sides. This makes it possible to ensure that the (annular) contact seals continue to lie in the circumferential surface even in the event of an axial shift because of an increase in pressure in the delivery duct.

The pump is furthermore advantageous if the circumferential surface of the pump housing and at least one counter bracket form at least one (annular) receptacle in which at least one (annular) edge region of the deformable element is received.

The deformable element preferably has, on both sides, two annular edge regions which are correspondingly positioned in two receptacles (arranged in each case to both sides of the central plane). The edge region of the deformable element describes in particular a section, which is situated particularly far to the outside in the axial direction, of the deformable element, or a section, which is particularly far remote from the central plane, of the deformable element. The annular contact seals are preferably arranged on the annular edge regions of the deformable element. The at least one counter bracket is preferably an annular component which supports the deformable element in the edge region from the inside against the pump housing. Between the counter bracket and the pump housing there is an annular gap which forms the annular receptacle. The at least one counter bracket can engage into the pump housing or engage (only in sections) around the pump housing, such that the described annular receptacle is formed between the counter bracket and the pump housing.

The at least one counter bracket assists a radial clamping of the deformable element. By means of the at least one counter bracket and of an (annular) receptacle formed by the at least one counter bracket, the edge region of the deformable element can be clamped in with the contact seal, such that an intense sealing action is generated by the contact seal and, in particular, no escape of fluid is possible at the contact seal. The at least one counter bracket preferably has an L-shaped cross-sectional area and thus engages in sections into the housing of the pump and engages around the deformable element.

The at least one counter bracket need not be connected to the pump housing. The at least one counter bracket may be movable relative to the pump housing. It is important that, between the at least one counter bracket and the pump housing, there is formed at least one (annular) receptacle in which the (annular) edge region of the deformable element is received. The at least one counter bracket may be a constituent part of a housing flange which is fastened to the pump housing. The at least one counter bracket may also be a component which is not connected to the housing flange and which is movable relative to the housing flange.

The pump is furthermore advantageous if at least one abutment surface is situated to the side of the deformable element and wherein at least one (annular) edge region of the deformable element bears against the at least one abutment surface.

The abutment surface is preferably likewise annular. The abutment surface is preferably arranged in a plane orthogonal to the axis of the pump. When the pressure in the delivery duct increases, the edge region is pressed against the abutment surface of the (annular) receptacle. In the process, the deformable element expands in a radial direction because more material of the deformable element is pressed into the (annular) receptacle. In this way, the pressing force against the contact seals is increased. The sealing action of the delivery duct is thus increased in the presence of increased pressure in the delivery duct. The deformable element in particular has edge regions on both sides in the axial direction, which edge regions are arranged in corresponding (annular) receptacles with (annular) abutment surfaces.

The pump is furthermore advantageous if the deformable element has in each case one rigid centering ring in encircling fashion in an edge region on both sides in the axial direction.

Said rigid centering rings may be fastened to the deformable element. For example, the centering rings may be injection-molded onto or clamped to the deformable element. The centering rings form counter brackets which, together with the pump housing, form annular receptacles into which the edge regions of the deformable element are braced. In the present case, the expression "rigid" means in particular that the centering rings are rigid in relation to the deformable element. The centering rings are centered in the pump housing by the deformable element. The centering rings are, for this purpose, particularly preferably mounted so as to be movable in a radial direction. The diameter of the centering rings is, in a manner dependent on the diameter of the circumferential surface of the pump housing and in a manner dependent on the material thickness of the deformable element, defined such that the deformable element, in the region of the contact seals, bears in a fully encircling and fluid-tight manner against the circumferential surface.

The (annular) contact seal is particularly preferably formed by an encircling thickened section in the edge region of the deformable element.

The concave or set-back duct surface of the deformable element is preferably formed by the encircling thickened section in the edge region. The duct surface has a central region which is surrounded (in the axial direction on both sides) by the encircling thickened section and which, in a preferred design variant, is flat. By means of a thickened section of said type, a sealing action at the contact seal is similar to that in the case of a conventional O-ring seal. An O-ring seal is a particularly effective sealing concept, the sealing action of which is known. In particular, it is possible for the pressure-dependent sealing action of the contact seal as a function of the pressure in the delivery duct to be calculated, and for the thickened section and the receptacle to be dimensioned correspondingly. The "concave" or "set-back" characteristic of the duct surface may additionally be assisted by means of a concave shape of the central region of the duct surface. The concave duct surface may however also be realized by way of a planar form of the surface of the deformable element in combination with the described thickened portions of the deformable element in the edge region.

Also to be described here is a motor vehicle, having an internal combustion engine, an exhaust-gas treatment device for the purification of the exhaust gases of the internal combustion engine, and a pump as described herein, wherein the pump is designed to deliver a liquid (in particular urea-water solution) for exhaust-gas purification (in particular in accordance with the SCR method) from a tank to an injector, by means of which the liquid additive can be supplied to the exhaust-gas treatment device.

BRIEF DESCRIPTION OF THE SEVERAL VIEWS OF THE DRAWING

The invention and the technical field will be explained in more detail below on the basis of the figures. In particular, it should be noted that the figures and in particular the proportions illustrated in the figures are merely schematic. The figures serve for illustrating individual features of the described pump. Design variants illustrated in the various figures may be combined with one another in any desired manner. In particular, it is not necessary for all of the features illustrated in a figure to be regarded in each case as a unit. In the figures.

DESCRIPTION OF THE INVENTION

Figure 1:
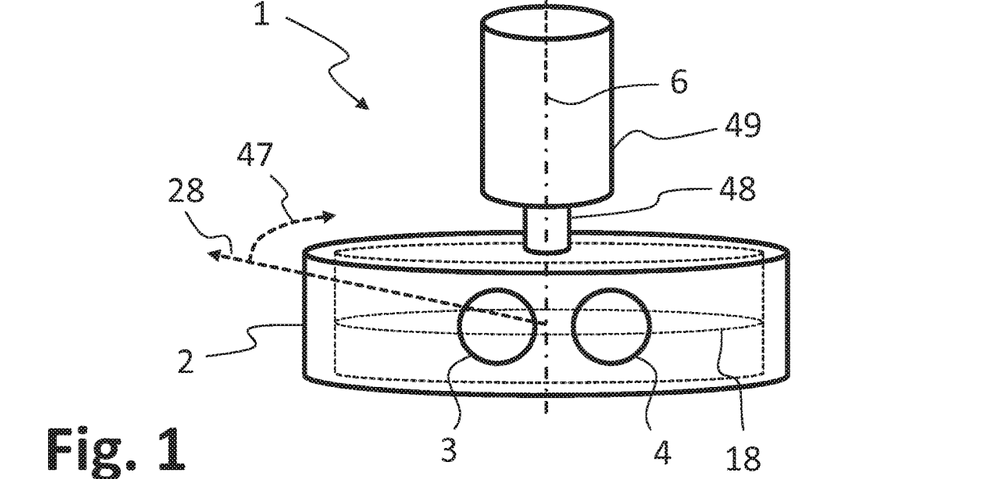
FIG. 1: shows an isometric illustration of a pump.

FIG. 1 shows a pump 1 which has a pump housing 2 with an inlet 3 and an outlet 4. In the pump housing 2 there may be positioned an eccentric (not illustrated here) which can be rotated for the delivery of liquid from the inlet 3 to the outlet 4. For the drive of the eccentric, an (electric) drive 49 is provided above the pump housing 2 along an axis 6 of the pump, which drive is connected to the eccentric via a drive shaft 48. For the further description of the pump 1, reference will be made not only to the axis 6 but also to a cylindrical coordinate system with an axial direction 32 along the axis 6, a radial direction 28 which is perpendicular to the axis 6 and to the axial direction 32, and a circumferential direction 47 which is tangential to the axial direction 32 and perpendicular to the radial direction 28. Reference may also be made to a central plane 18 which centrally divides the pump housing 2 and the components (in particular the eccentric (not illustrated) and a deformable element (not illustrated)) arranged in the pump housing 2. The pump housing 2 and the eccentric and the deformable element are preferably formed in each case symmetrically with respect to the central plane 18.

Figure 2:
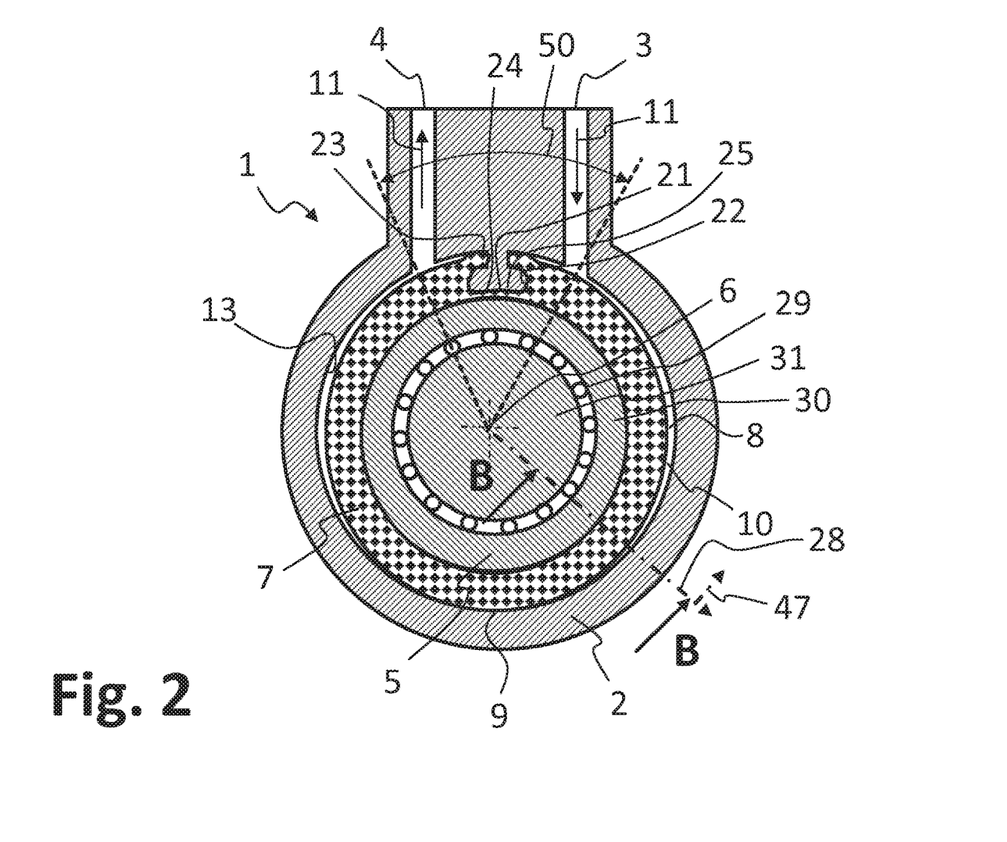
FIG. 2: shows a section through the pump from FIG. 1.

FIG. 2 illustrates a section through the pump as per FIG. 1 in the defined central plane. To illustrate this, the circumferential direction 47 and the radial direction 28 are denoted in FIG. 2.

The figure shows the pump housing 2 with the inlet 3 and the outlet 4 which are arranged in an angle 50 with respect to the pump housing 2. In the pump housing 2 there is situated the eccentric 5 which can perform an eccentric wobbling movement about an axis 6. The eccentric 5 is divided into an inner eccentric region 29 and an outer bearing ring 30 and a bearing 31. When the inner eccentric region 29 performs an eccentric rotational movement about the axis 6, the bearing 31 transmits this to the bearing ring 30, such that the bearing ring 30 performs an eccentric wobbling movement. There is a deformable element 7 and a delivery duct 8 between the pump housing 2 and the eccentric 5. The delivery duct 8 is formed between the pump housing 2 and the deformable element 7. The eccentric 5 presses the deformable element 7 in sections against the pump housing 2 such that a displaceable seal 9 is formed which interrupts the delivery duct 8 and divides the delivery duct 8 into closed pump volumes 10. By means of a rotation of the eccentric 5, the displaceable seal 9 can be displaced along a delivery direction 11 from the inlet 3 to the outlet 4.

The deformable element 7 as per FIG. 2 has, between the inlet 3 and the outlet 4, a static seal 25 which prevents the liquid from flowing back from the outlet 4 to the inlet 3. The static seal 25 is formed by a recess 21 which has undercuts 22, the latter being spanned in each case by projections 23 of the deformable element 7. The recess 21 is in this case of T-shaped form. A retention section of the pump housing 2 engages into the recess 21. Said retention section 24 may be an integral constituent part of the pump housing 2 or may be a component which is separate from the pump housing 2 and which is additionally inserted into the pump housing 2. By means of the recess 21 and the retention section 24, the deformable element 7 is fixed in the pump housing 2 so as to be prevented from rotating. FIG. 2 illustrates only one possible design variant of a static seal 25. Numerous further variants of a static seal 25 are possible. It is important merely that a flow of liquid from the outlet 4 back to the inlet 3 is effectively prevented here. For this purpose, the deformable element 7 may for example also be adhesively bonded to the pump housing 2 in the region of the static seal 25.

Figure 3:
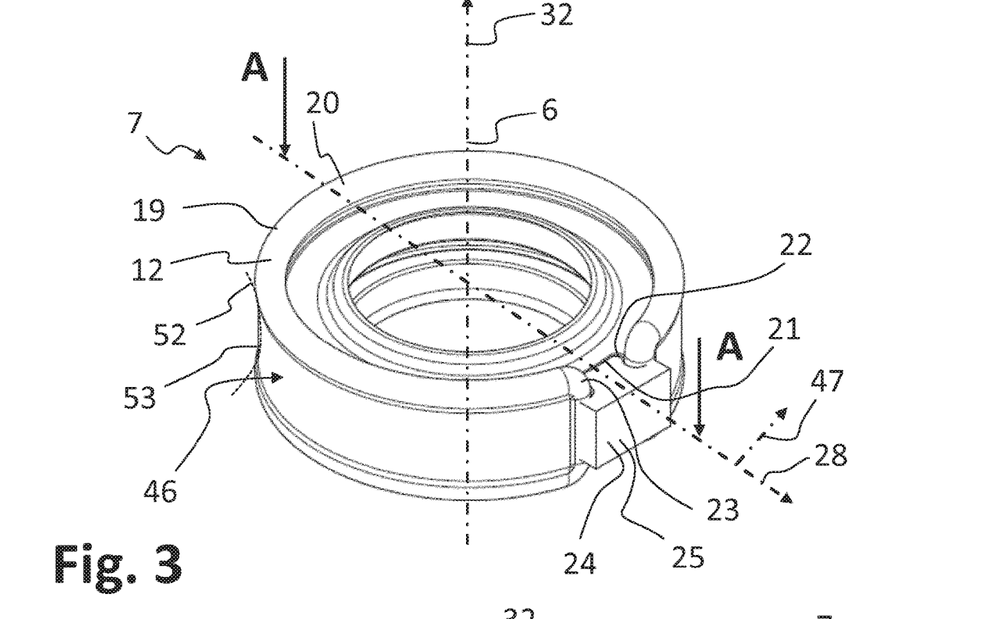
FIG. 3: shows a deformable element of a pump.
Figure 4:
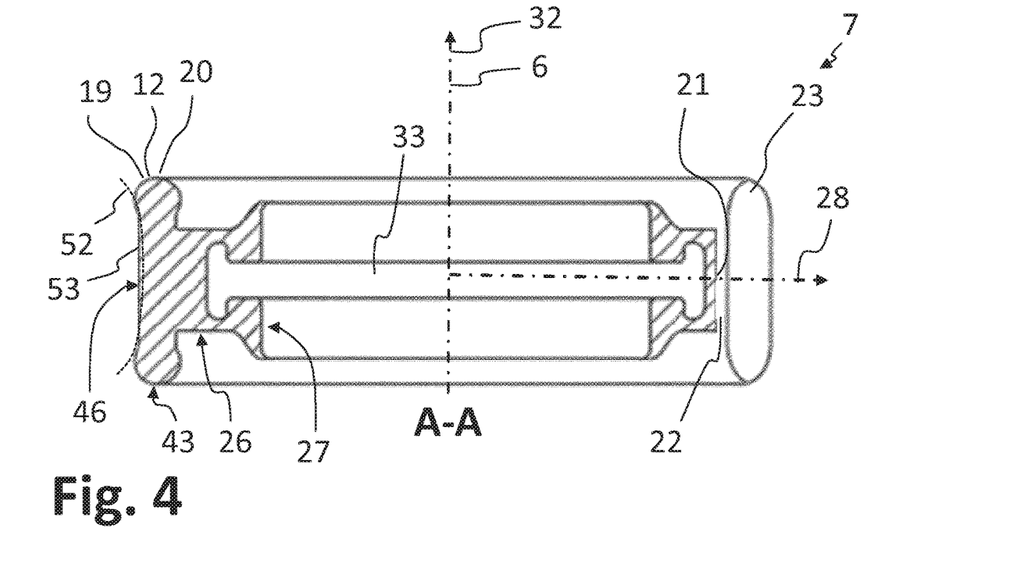
FIG. 4: shows a section through the deformable element from FIG. 3.

FIG. 3 shows an isometric illustration of the deformable element 7 of the pump. FIG. 4 shows, in a sectional view, the same deformable element 7. For spatial orientation, the coordinate system composed of axial direction 32 along the axis 6, circumferential direction 47 and radial direction 28 is illustrated in the figure. The deformable element 7 has an (outer) set-back duct surface 46 which is shaped to be concave in the axial direction 32. The concave form of the duct surface 46 is illustrated in FIG. 3 by a dashed marking line 52. The concave or set-back duct surface 46 of the deformable element 7 has, in an encircling edge region 20, a thickened section 19 which forms a contact seal 12 at which the deformable element 7 bears against the circumferential surface (not illustrated here) of the pump housing. The "concave" characteristic of the concave or set-back duct surface 46 is preferably caused by the thickened portion 19 on both sides. The thickened portion 19 on both sides surrounds a central region 53 on the deformable element 7, wherein the central region 53 is preferably flat. The concave or set-back duct surface 46 can thus be formed by the central region 53 and by the thickened portion 19 on both sides. In addition, the central region 53 itself may also have a concave form. It is also possible to see a recess 21 on the concave or set-back duct surface 46 of the deformable element. The recess 21 is delimited in this case by an undercut 22 and by projections 23 which extend from over the undercut 22. A retention section 24 of the pump housing 2 (not illustrated here) engages into the recess 21. A recess 21 forms the static seal 25 described hereinabove.

For orientation, the axis 6 and the axial direction 32 and the radial direction 28 are likewise illustrated in FIG. 4. It is also possible to see the concave or set-back duct surface 46 of the deformable element 7, said concave or set-back duct surface being indicated by the marking line 52 and being formed by the thickened portions 19 in the edge region and by the central region 53 of the duct surface 46. On the right-hand side in FIG. 4, the deformable element has been cut away in the region of the recess 21, such that the undercut 22 and a projection 23 are visible. It can also be seen in FIG. 4 that the deformable element 7 has a contact region 43 and a support region 27 which are connected to one another via a waist 26, wherein the contact region 43 forms the duct surface 46 and is provided on the pump housing in order to form the delivery duct. On the support region 27, there is provided a clamping groove 33 by means of which the deformable element 7 can be clamped on a clamping strip (of the eccentric which is not illustrated here).

Figure 5:
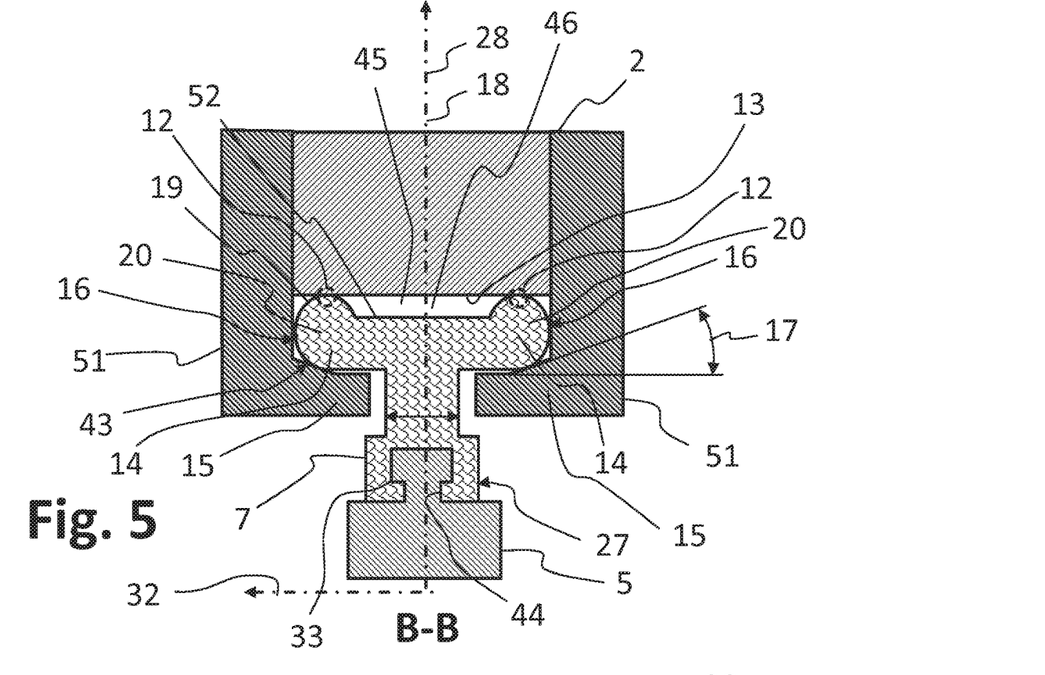
FIG. 5: shows a detail section through the pump as per FIG. 2.

FIG. 5 shows the detail section B-B, marked in FIG. 2, through the pump. For orientation, the central plane 18, the radial direction 28 and the axial direction 32 are indicated. The figure shows the pump housing 2 and the eccentric 5 and the deformable element 7 between the eccentric 5 and the pump housing 2. The figure also shows the circumferential surface 13 of the pump housing 2 and the concave or set-back duct surface 46 of the deformable element 7 and also the two linear contact seals 12 between the deformable element 7 and the pump housing 2, which together delimit the duct cross section 45.

The deformable element 7 has a contact region 43, which forms the concave or set-back duct surface 46. The deformable element 7 also has a support region 27 which is formed in relation to the contact region 43. In the support region 27, the deformable element has a clamping groove 33 which engages into a clamping strip 44 of the eccentric 5. The concave or set-back duct surface 46 is formed by a (flat) central region 53 and by edge regions 20 which adjoin said central region on both sides, wherein thickened portions 19 are formed in each of the edge regions 20.

FIG. 5 also illustrates two counter brackets 15 formed from housing flanges 51 and which, as annular components, are inserted into the pump housing 2 on both sides and each form an annular receptacle 14 in which the edge regions 20 of the deformable element 7 are received. The counter bracket 15 and the pump housing 2 engage around the deformable element 7 only in sections. In the receptacle 14, to the sides of the deformable element 7, there is in each case one abutment surface 16 on which the deformable element 7 lies. When the pressure in the delivery duct 8 rises the edge regions 20 are pressed more firmly against the abutment surfaces 16. The receptacles 14 preferably have, toward the outside (in each case away from the central plane 18 in the axial direction 32), a chamfer 17 by means of which the receptacle 14 narrows toward the outside up to the abutment surface 16. It can be assisted in this way that a pressing force on the contact seal 12 increases the more firmly the edge region 20 is pushed outward up to the abutment surface 16 by the pressure in the delivery duct 8.

A duct cross section 45 of the delivery duct 8 is delimited by the circumferential surface 13 of the pump housing 2, the concave or set-back duct surface 46 of the deformable element 7 and the two annular contact seals 12.

Figures 6, 7:
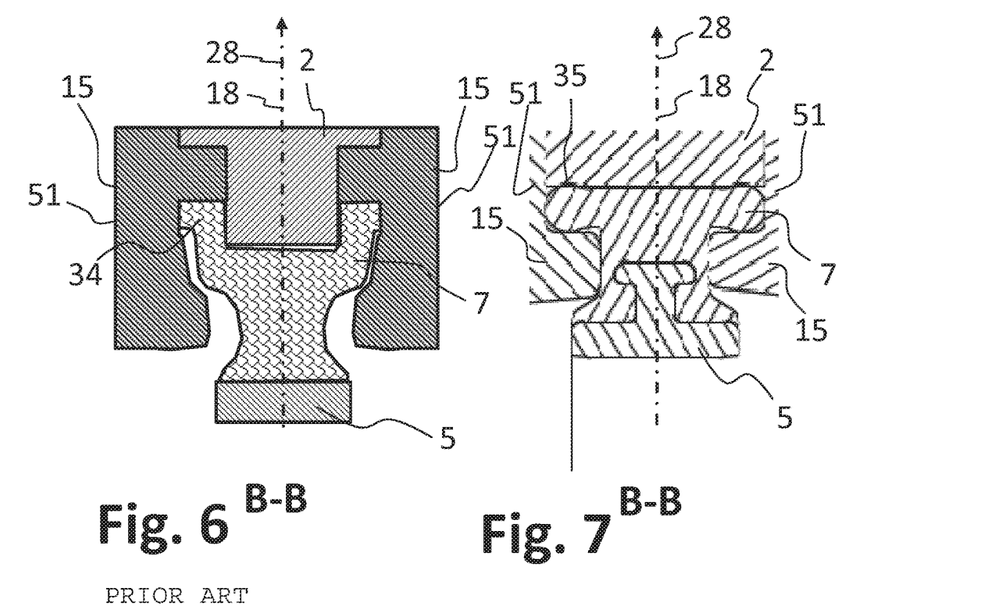
FIG. 6: shows a section, corresponding to FIG. 4, through a pump from the prior art.
FIG. 7: shows a further illustration of the section from FIG. 5 compared with FIG. 6, FIG. 8: shows a section, corresponding to FIG. 5, through a further alternative embodiment of a described pump.

FIGS. 6 and 7 illustrate, again schematically, the cross section B-B from FIG. 5, wherein FIG. 6 describes a corresponding cross section in the case of a pump according to the prior art (for example as per the documents U.S. Pat. Nos. 2,544,628, 3,408,947, DE 285 39 16 A1 and DE 381 52 52 A1) and FIG. 7 illustrates the design of the pump described here. For orientation, the central plane 18, the radial direction 28 and the axial direction 32 are illustrated here (as in FIG. 5). The figure also shows the pump housing 2, the eccentric 5 and the deformable element 7 and also the counter brackets 15 formed by housing flanges 51 by means of which the deformable element 7 is braced against the pump housing 2. In the design variant according to the prior art in FIG. 6, the deformable element 7 extends in sections around the pump housing 2 and is braced, by way of an axial clamping section 34, between the counter brackets 15 and the pump housing 2. As per FIG. 7, there is a radial clamping section 35 of the deformable element 7 between the pump housing 2 and the eccentric 5, as has also already been described in conjunction with FIG. 5 by means of the corresponding arrangement of the annular edge regions of the deformable element 7.

Figure 8:
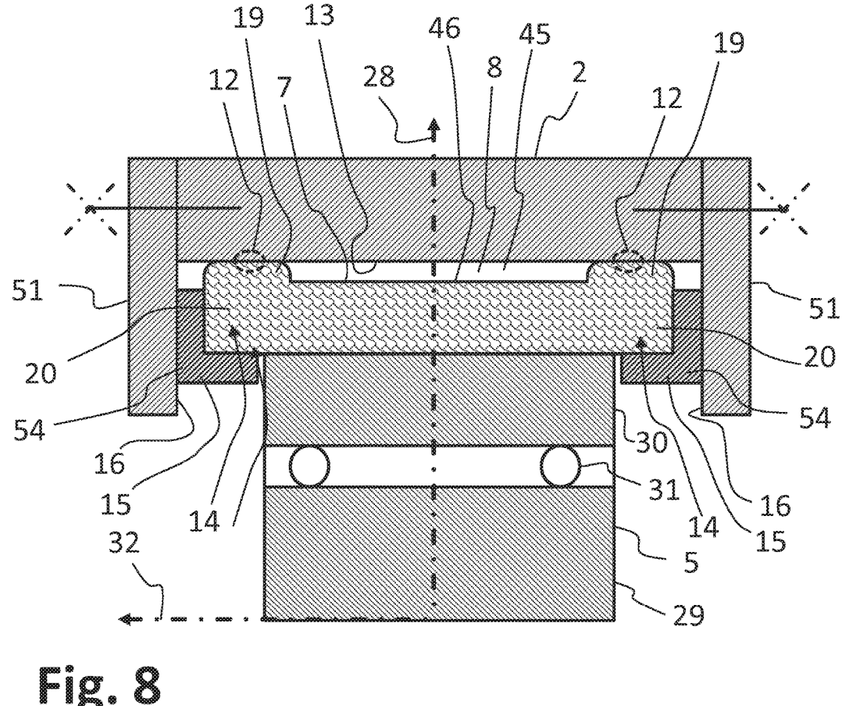

FIG. 8 shows a cross section, corresponding to FIG. 5, through a further design variant of a described pump. In this case, too, it is possible to see the pump housing 2, the deformable element 7 and the eccentric 5. The delivery duct 8 is formed between the deformable element 7 and the pump housing 2. A duct cross section 45 of the delivery duct 8 is delimited by a concave or set-back duct surface 46 of the deformable element 7, a circumferential surface 13 of the pump housing 2, and two annular contact seals 12 between the circumferential surface 13 and the concave or set-back duct surface 46.

For orientation, FIG. 8 also shows the radial direction 28 and the axial direction 32 corresponding to FIGS. 5 to 7.

The annular contact seals 12 are formed by thickened portions 19 of the deformable element 7 in the edge regions 20. The edge regions 20 of the deformable element are received in annular receptacles 14, wherein the annular receptacles 14 are formed by the pump housing 2 and counter brackets 15. The counter brackets 15 are, in the design variant of the pump from FIG. 8, formed by centering rings 54 which are mounted so as to be movable in the radial direction 28. The centering rings 54 may be connected to the deformable element 7. The centering rings 54 and/or the deformable element 7 bear(s) in each case in the axial direction 32 against an abutment surface 16. The centering rings 54 permit an alternative design of the counter brackets 15 and of the annular receptacles 14 for the annular edge regions 20 of the deformable element 7, wherein the centering rings 54 simultaneously permit autonomous centering and orientation of the counter brackets 15 and of the annular receptacle 14.

In FIG. 8, the eccentric 5 is, by way of example, illustrated with an inner eccentric region 29, an outer bearing ring 30 and an interposed bearing 31.

Figure 9:
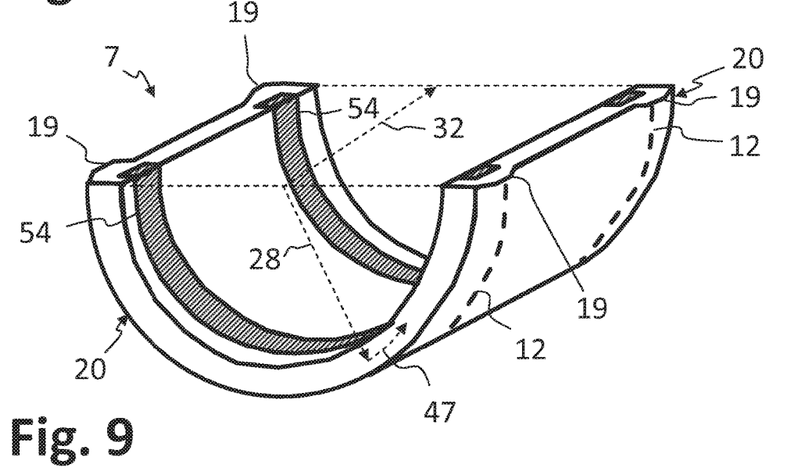
FIG. 9: shows a deformable element for a pump according to the alternative embodiment from FIG. 8, and FIG. 10: shows a motor vehicle having a pump for implementing the SCR method.

FIG. 9 shows a deformable element 7 for a pump as per the design variant illustrated in FIG. 8. In the two edge regions 20 arranged (in the axial direction 32), the deformable element 7 has in each case centering rings 54 which, together with the pump housing 2 (not illustrated here) form, in the manner of the illustration from FIG. 8, counter brackets or receptacles for the edge regions 20 of the deformable element 7. In FIG. 9, for improved illustration, the centering rings 54 are however not designed so as to engage around the edge regions 20 of the deformable element 7. Said centering rings are integrated into the deformable element 7. The centering rings 54 however correspond in terms of mode of operation to the centering rings 54 in the design variant as per FIG. 9 with L-shaped centering rings which engage around the edge regions 20. For orientation, thickened portions 19 of the deformable element 7 are also illustrated in FIG. 9. At the thickened portions 19, (annular) contact seals 12, indicated by dashed lines, are formed with the pump housing (not illustrated here). For orientation, FIG. 9 also shows the circumferential direction 47, the radial direction 28 and the axial direction 32.

Figure 10:
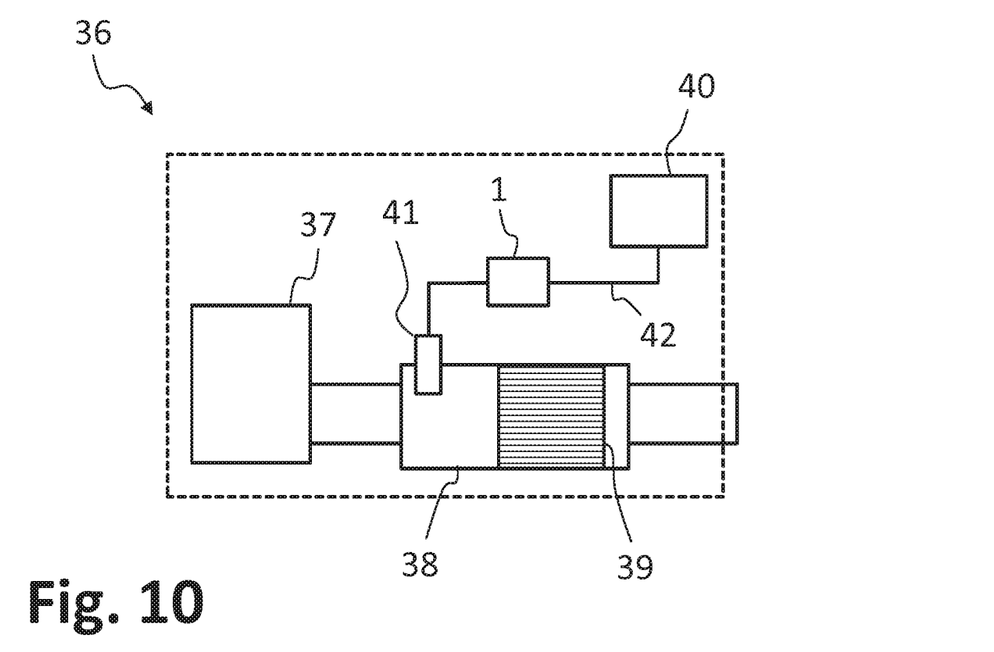

FIG. 10 shows a motor vehicle 36 with an internal combustion engine 37 and an exhaust-gas treatment device 38 for the purification of the exhaust gases of the internal combustion engine 37. In the exhaust-gas treatment device 38 there is provided an SCR catalytic converter 39 for carrying out the method of selective catalytic reduction. A liquid additive for exhaust-gas purification may be supplied to the exhaust-gas treatment device 38 by means of an injector 41. Liquid additive is supplied from a tank 40 to the injector 41 via a line 42. On the line 42 there is arranged a pump 1 as described above, which pump performs the delivery and if appropriate dosing of the liquid additive.

LIST OF REFERENCE NUMERALS

1 Pump
2 Pump housing
3 Inlet
4 Outlet
5 Eccentric
6 Axis
7 Deformable element
8 Delivery duct
9 Displaceable seal
10 Pump volume
11 Delivery direction
12 Contact seal
13 Circumferential surface
14 Receptacle
15 Counter bracket
16 Abutment surface
17 Chamfer
18 Central plane
19 Thickened section
20 Edge region
21 Recess
22 Undercut
23 Projection
24 Retention section
25 Static seal
26 Waist
27 Support region
28 Radial direction
29 Eccentric region
30 Bearing ring
31 Bearing
32 Axial direction
33 Clamping groove
34 Axial clamping section
35 Radial clamping section
36 Motor vehicle
37 Internal combustion engine
38 Exhaust-gas treatment device
39 SCR catalytic converter
40 Tank
41 Injector
42 Line
43 Contact region
44 Clamping strip
45 Duct cross section
46 Duct surface
47 Circumferential direction
48 Drive shaft
49 Drive
50 Angle
51 Housing flange
52 Marking line
53 Central region
54 Centering ring

The invention claimed is:

1. A pump for delivering a liquid, the pump comprising:
at least one pump housing having at least one inlet, at least one outlet and a circumferential surface, said pump housing having a pump axis defining an axial direction of the pump;
an eccentric disposed in said pump housing and rotatable relative to said pump housing about said pump axis;
a deformable element disposed between said pump housing and said eccentric, said deformable element having a set-back duct surface and said deformable element defining at least one contact seal between said circumferential surface and said deformable element, said set-back duct surface being set back from a contact position of said at least one contact seal against said circumferential surface;
a delivery duct extending from said at least one inlet to said at least one outlet, said delivery duct being formed by said deformable element and said circumferential surface;
said deformable element being pressed in sections against said pump housing by said eccentric to form at least one displaceable seal of said delivery duct and at least one closed pump volume in said delivery duct;
said at least one displaceable seal and said at least one closed pump volume being displaceable along said delivery duct from said at least one inlet to said at least one outlet by a movement of said eccentric for a delivery of the liquid; and
said delivery duct having at least one duct cross section delimited by said circumferential surface, by said set-back duct surface and by said at least one contact seal;
said delivery duct having two sides; and said circumferential surface continuing in said axial direction of the pump towards said two sides of said delivery duct beyond said at least one contact seal of said deformable element.

2. The pump according to claim 1, which further comprises:
at least one counter bracket;
said deformable element having at least one edge region;
said circumferential surface of said pump housing and said at least one counter bracket forming at least one receptacle; and
said at least one edge region of said deformable element being received in said at least one receptacle.

3. The pump according to claim 1, which further comprises:
at least one abutment surface situated towards sides of said deformable element;
said deformable element having at least one edge region bearing against said at least one abutment surface.

4. A motor vehicle, comprising:
an internal combustion engine;
an exhaust-gas treatment device for purification of exhaust gases of said internal combustion engine;
a tank for storing a liquid additive for exhaust-gas purification;
an injector for supplying the liquid additive to said exhaust-gas treatment device; and
a pump according to claim 1 configured to deliver the liquid additive from said tank to said injector.

5. A pump for delivering a liquid, the pump comprising:
at least one pump housing having at least one inlet, at least one outlet, a pump axis, and a circumferential surface;
an eccentric disposed in said pump housing and rotatable relative to said pump housing about said pump axis;
a deformable element disposed between said pump housing and said eccentric, said deformable element having a set-back duct surface and said deformable element defining at least one contact seal between said circumferential surface and said deformable element, said set-back duct surface being set back from a contact position of said at least one contact seal against said circumferential surface, said deformable element including two sides each having a respective edge region, and said deformable element having rigid centering rings each encircling a respective one of said edge regions on a respective one of said sides of said deformable element in an axial direction;
a delivery duct extending from said at least one inlet to said at least one outlet, said delivery duct being formed by said deformable element and said circumferential surface;
said deformable element being pressed in sections against said pump housing by said eccentric to form at least one displaceable seal of said delivery duct and at least one closed pump volume in said delivery duct;
said at least one displaceable seal and said at least one closed pump volume being displaceable along said delivery duct from said at least one inlet to said at least one outlet by a movement of said eccentric for a delivery of the liquid; and
said delivery duct having at least one duct cross section delimited by said circumferential surface, by said set-back duct surface and by said at least one contact seal.

6. The pump according to claim 5, wherein said centering rings are mounted to be movable in a radial direction.

7. A pump for delivering a liquid, the pump comprising:
at least one pump housing having at least one inlet, at least one outlet and a circumferential surface, said pump housing having a pump axis defining an axial direction of the pump;
an eccentric disposed in said pump housing and rotatable relative to said pump housing about said pump axis;
a deformable element disposed between said pump housing and said eccentric, said deformable element having a set-back duct surface and said deformable element defining at least one contact seal between said circumferential surface and said deformable element, said deformable element including at least one edge region having at least one encircling thickened section forming said at least one contact seal;
a delivery duct extending from said at least one inlet to said at least one outlet, said delivery duct being formed by said deformable element and said circumferential surface;
said deformable element being pressed in sections against said pump housing by said eccentric to form at least one displaceable seal of said delivery duct and at least one closed pump volume in said delivery duct;
said at least one displaceable seal and said at least one closed pump volume being displaceable along said delivery duct from said at least one inlet to said at least one outlet by a movement of said eccentric for a delivery of the liquid; and
said delivery duct having at least one duct cross section delimited by said circumferential surface, by said set-back duct surface and by said at least one contact seal;
said delivery duct having two sides; and
said circumferential surface continuing in said axial direction of the pump towards said two sides of said delivery duct beyond said at least one contact seal of said deformable element.

* * * * *